United States Patent Office 3,491,623
Patented Jan. 27, 1970

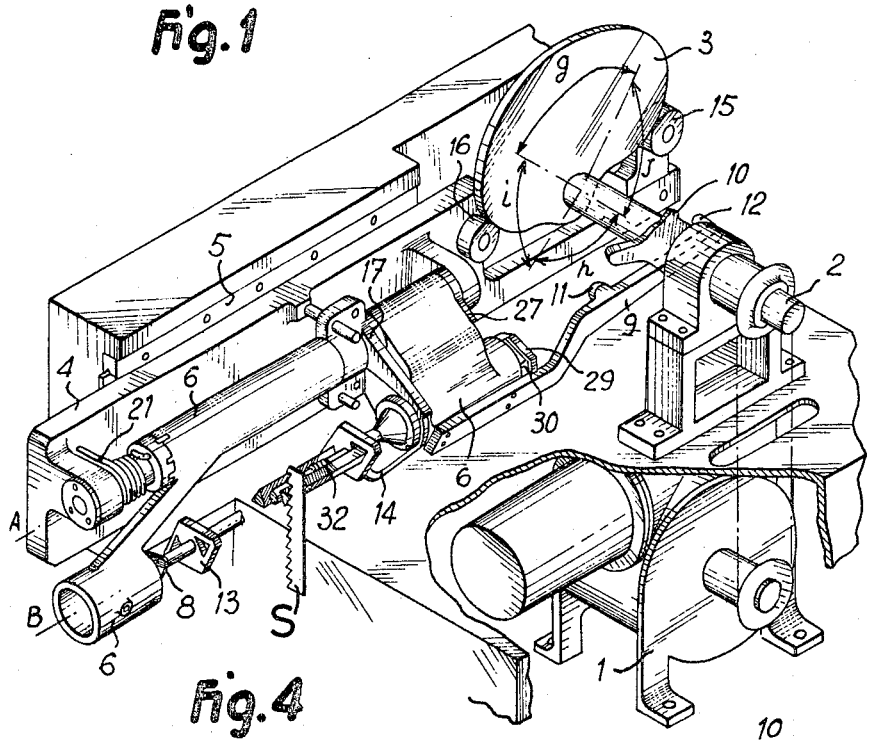

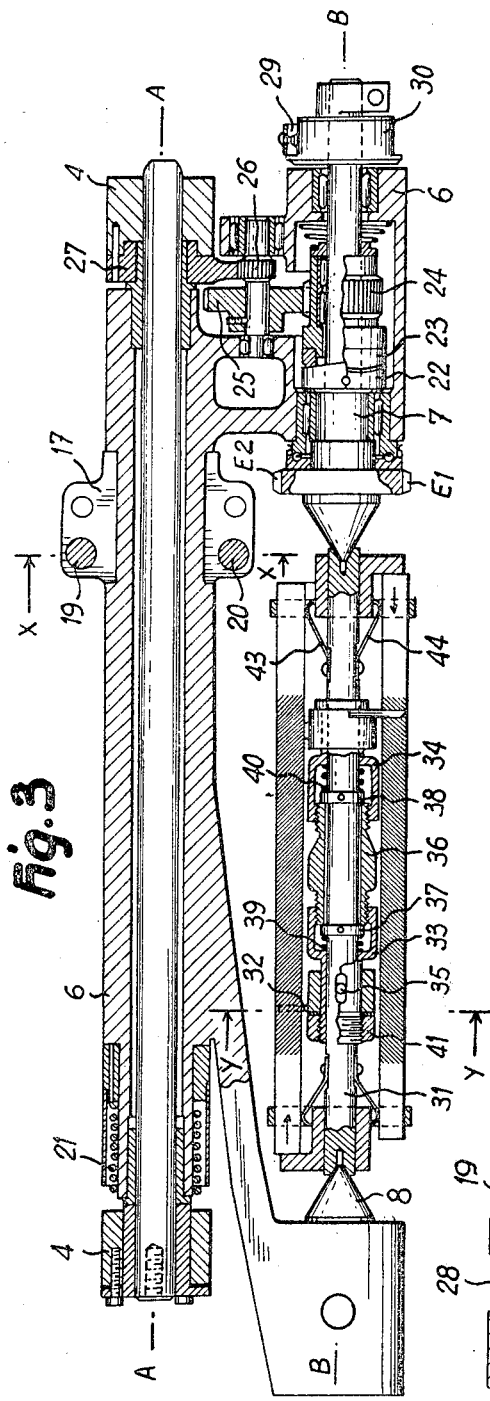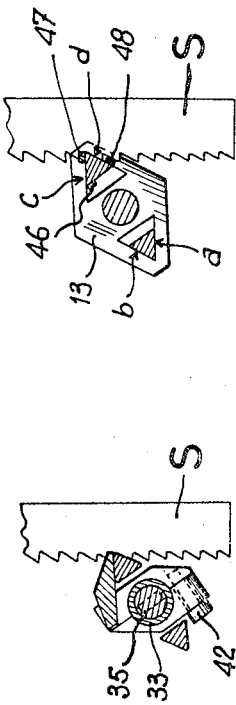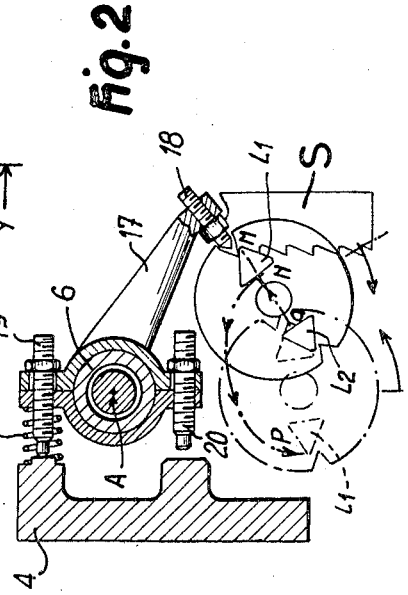

3,491,623
METHOD AND MACHINE FOR SHARPENING AND SETTING SAWS
Daniel Sage and Emile Sage, both of 40 Avenue du Stand, 58 Nevers, France
Filed Mar. 14, 1968, Ser. No. 713,082
Claims priority, application France, Mar. 20, 1967, 99,388
Int. Cl. B23d *63/08, 63/00*
U.S. Cl. 76—33        12 Claims

ABSTRACT OF THE DISCLOSURE

A method, machine or apparatus for sharpening and setting saws, the sharpening being done by two alternatingly operating, reciprocatingly movable files and the setting being done by pushing elements connected or associated with the files or their holders, respectively.

DESCRIPTION

The object of the present invention is an improvement in machines for sharpening saws.

The sharpening of saw blades which are thin and have fine teeth has always given rise to delicate problems. In-modifies the structure of the steel if no special precautions are taken. This is particularly the case when the sharpening is done by grinding discs.

Machines for sharpening with files have been known since a very long time. They permit a technically perfect sharpening, which means that the structure of the metal is not modified. However, in many cases these machines have disadvantages in that they cannot carry out the sharpening of thin saw blades. Moreover, the files of these known sharpening machines perform their work in one direction only, which leads to disadvantages, such as the deformation of the setting and the formation of a burr on one side only of the blade, which are causes of defective sawing.

The present invention avoids the aforesaid shortcomings of the prior art devices. Moreover, it particularly permits the speeding-up of the cycle of operations without modifying the structure of the steel or the accuracy of the work. The invention permits furthermore the execution of the sharpening of thin saw blades with fine teeth in a much shorter time. Morever, the present invention permits not only the improvement of the quality of the sharpening but in addition it increases greatly the working life of the files. In the long run, the kinematics of the present invention are excellent, the wear of its mechanical moving parts has proved to be practically nil, after nine months of continuous work, and the synchronisation of the different operations of sharpening and setting is perfect and engenders a functioning without any mishap.

The main object of the present invention is to provide a mechanism for sharpening saw blades by means of files working in both directions of their reciprocating rectilinear movements, and in which the kinematics of the sharpening permit the setting in the same operation as the sharpening.

The mechanism, apparatus or machine according to the present invention comprises an assembly rectilinearly movably associated with a slide, the latter being driven by a reciprocating rectilinear movement and having its movement interrupted at the end of each stroke. Said assembly is mainly composed of a casing adapted to pivot through a limited, small angle about an axis parallel to the cutting movement during the interrupation of the reciprocating movement of the slide at the end of each stroke. This casing is adapted to carry two parallel files, each occupying the same working position when in engagement with a saw blade. In this working position, each file exerts a constant pressure on the saw and this pressure is distributed over the two surfaces to be filed.

During the time of the interruption of movement at the end of each stroke, the pivoting of the casing permits:
(1) Disengagement of the file which had been in action during the preceding stroke.
(2) Change-over from one file to the other.
(3) Engagement of the second file in the same working plane.

During the change-over of the files, i.e. during each stop of the slide, the saw advances by one tooth and consequently the second file engages the next following tooth.

The casing also carries the setting device which simply consists of two setting pushers being adjustably mounted in such a manner that at the end of the stroke each pusher bends the tooth which had just been filed. Since the setting pressure of the two pushers works in both directions of the cutting movement, it is important that the slide must be driven positively in both directions.

A better and more complete understanding of the invention will be obtained from the following description of one of its embodiments when read together with the attached drawings illustrating such embodiment.

In the attached drawings, diagrammatically illustrating by way of example one embodiment:

FIG. 1 is a general perspective view of the entire mechanism indicating the cutting movements and the change-over of the files;

FIG. 2 is a fragmentary section taken in about the plane X—X of FIG. 3, illustrating the extent of the pivoting movement of the casing and the paths of the files during this pivoting;

FIG. 3 is a longitudinal section through the casing and a partial plan view thereof illustrating, by way of example, one embodiment of the tool-holder;

FIGS. 4 and 5 show in side and front elevation, respectively, the cam and cam-follower means as an embodiment of means for lifting the casing;

FIG. 6 is a section taken about along line Y—Y of FIG. 3 and shows one embodiment of a setting device mounted on the tool-holder; and FIGS. 7 and 8 are two views of a different embodiment of a setting device, FIG. 7 being a section taken along line Z—Z of FIG. 8.

A speed-reduction gear 1 (FIG. 1) imparts a constant speed to a cam shaft 2 by pulleys and a chain or belt, the latter being indicated by dot-and-dash lines.

A cam 3 keyed to a shaft 2 engages two cam-follower rollers 15 and 16 secured to a slide 4 so as to impart reciprocating movement to the slide in a guide 5 being a part of the stationary machine frame. Cam 3 having a constant distance between its points engaging the cam followers 15 and 16, comprises two regions. The one region imparts the uniformly changing movement to slide 4 (arcs *i* and *j*); the other region causes the interruption of the movement or the standstill of the slide 4 at each end of its stroke (arcs *g* and *h*). Thus, the slide is being driven in a positive manner with a uniformly changing movement interrupted at each end of its strokes by a standstill at a predetermined, constant position.

A casing 6 being capable of pivoting movement through a small limited angle about axis A of slide 4 comprises a spindle or shaft 7 and a tailstock 8 on an axis B paralleling axis A. A tool-holder 13 is placed between the points of spindle 7 and tailstock 8, and a driving-dog 14 is integrally connected with spindle 7 so as to rotate therewith. The tool-holder is provided at each end between spindle 7 and tailstock 8 with passages *ab* and *bc*. (FIGS. 1 and 7) arranged symmetrically to its axis B. Each file L1 and L2, respectively, can easily be inserted into these passages and is maintained therein by two pairs of leaf-springs 43 and 44 (FIG. 3).

Two rollers 11 and 12 are mounted on a lifting lever 9 (FIGS. 1, 4 and 5) integrally connected with or formed on casing 6, and the two rollers 11 and 12 are spaced from each other by the length of the stroke of slide 4 in such a manner that either of them will occupy the same position under a lift-cam 10 at each end of the stroke of slide 4. Lift-cam 10 is keyed to shaft 2 in such a manner that it comes in contact with one of the rollers 11 and 12 only when the slide 4 is at one end of its run.

A spring 21 (FIG. 3), one end of which being secured to slide 4 and the other end to casing 6, tends to pivot casing 6 about axis A and to transmit its tension to a positioning lever 17. Lever 17 (FIG. 2) carries an indexing-bolt 18 which is adapted to be received in one of the two diametrically opposed recesses E1 or E2, respectively, formed on a collar of spindle 7 (FIG. 3). Each one of these positions of spindle and casing represents one of the working positions for one of the files and is therefore maintained during the movement of the slide.

At each end of the movement, lift-cam 10 acts upon one of the rollers 11 and 12 and releases the casing from its "working" position in causing it to pivot about its axis A in tensioning spring 21. The latter thereby returns the casing to its initial "working" position. The purpose of this pivoting is to switch the files around as will be explained later on. So as to simplify this description, a distinction will be made between: the "lifting," i.e. the pivoting about axis A of the casing and tool-holder assembly in the direction of disengagement of the files; and the "descending," i.e. the opposite movement.

In the "lifting" direction of movement, the pivoting of casing 6 comprises two operations:

(a) The disengagement of the file from its working plane occupied as a direct consequence.
(b) The rotation about 180° of the tool-holder as a result of the following concept.

A pinion 24 (FIG. 3) is rotatably mounted on spindle 7 and engages a toothed sector 27 via two pinions 25 and 26. Since the toothed sector 27 is integral with slide 4 and consequently non-rotatably fixed, the alternating pivoting of casing 6 about axis A causes a rotation of pinion 24 in both directions. A pawl 23 being integral with pinion 24 drives in one direction a ratchet 22 which is intergrally formed with spindle 7. The amount of the pivoting of casing 6 is such that it causes a rotation of about 270° of pinion 24 alternatingly first in the one and then in the other direction. In this manner, since ratchet 22 has two indentations 180° apart, spindle 7 rotates 180° relative to casing 6 in taking along the tool-holders and the files. At each descending, pinion 24 turns in its opposite direction and does not take spindle 7 with it.

Since these movements are very fast, the inertia of the elements making a half-turn pivoting movement about the axis B of the spindle must be compensated for. For this purpose, a brake composed of a member 29 engaged by a leafspring on casing 6 presses against the periphery of a cylindrical element 30 which is mounted on spindle 7 and provided with two diametrically opposed flat surfaces (FIGS. 1 and 3). These flat surfaces define together with member 29 the two approximate angular working positions of spindle 7, the exact positions being finally imparted by indexing-bolt 18 of positioning lever 17 and recesses E1 and E2, respectively.

During the lifting, file L1 (FIG. 2) having been in working position describes the MNP path which is a combination of the simultaneous movements of casing 6 about axis A and of spindle 7 about its axis B. This path originates from a circle arc MN about axis A, because spindle 7 does not turn right from the beginning, which is a direct consequence of the angle of rotation of pawl 23 which is greater than 180°. During descending, the path of file 12 is a circle arc QM about axis A. Thus, the entry of the file L1 or L2 into a space between two teeth of a saw blade S is achieved obliquely, following this path.

For the pressure to be exerted by the file on the saw, the file must, in its entering movement, come into contact with the tooth to be filed before spindle 7 rests on the positioning lever 17. The angular position of the spindle (and of the file) is therefore only given by brake element 29 and one flat surface of cylinder 30, and thus the position is neither very accurate nor very stable. Therefore, to correct this, the positioning lever 17 (FIG. 2) has a play or clearance about axis A, and a spring 28 enables said lever to accompany the spindle for a few millimetres of the "lifting" before pivoting relative to casing 6. Also during the descending, indexing bolt 18 will position spindle 7 before the file touches the tooth. It is not until the end of the setting of the tooth that the positioning lever will rest against slide 4, through screw 19.

Now that the kinematics of the sharpening having been described, there remains to describe how a setting-pusher mounted directly on each file or on the tool-holder upon termination of its travel, bends the tooth that has just been sharpened.

The so far described tool-holder is capable of taking two files and two setting pushers. An example of mounting adjustable pushers is shown in FIGS. 3 and 6. A setting pusher 32 is mounted on a sliding sleeve 33 which is held by a pin against turning about shaft 31, while permitting movement along said shaft. A machined knob 36 is held against movement along shaft 31 by two rings 37 and 38 and is provided with two oppositely directed screw threads which are screwed into the sleeves 33 and 34. Rotation of knob 36 causes oppositely directed displacements of sleeves 33 and 34. Springs 39 and 40 serve for taking up the play and for braking of knob 36.

So that the two setting pushers will bend the teeth to the same degree, pusher 32 is furthermore separately adjustable. Its adjustment is achieved by means of nut 41 against which it rests, after loosening a screw 42 which secures it on sliding sleeve 33.

Since the sharpening device is equipped with a symmetrical screw-device, the symmetry adjustment of pusher 33 is necessary once only. Afterwards, the machined knob 33, comprising guiding marks, enables imparting more or less set to the saw.

There is another possible solution consisting in the securement, either through brazing or a mechanical means, of setting projections or grains 46, 47, 48 on the files (FIGS. 7 and 8). In that case the files are to be adjusted longitudinally, for example, by a screw 49 at that end of the file, which takes the setting pressure.

According to the design of the machine, it may be preferable to set one or other tooth in engagement with the respective file.

The machine for sharpening and setting saws finally comprises clamping and pushing means of classical type which can easily be driven by camshaft 2 and having the jaws of the clamping means adapted for symmetrical tightening and for blocking the saw only while the files and the setting pushers are working.

It should be understood that, while the described and illustrated embodiment provides mechanical means such as cams and levers, gears etc. for obtaining the movements and achieving their synchronisation, this could also be achieved by electrical, pneumatic or hydraulic means.

Certain modifications have been suggested and described. Other modifications and variations will occur to those skilled in the art. All such modifications and variations are intended to be within the scope and spirit of the present invention as outlined by the attached claims.

What is claimed is:
1. In a method of sharpening saws by means of files, comprising the steps of:
 providing at least two parallelly extending files and reciprocatingly moving said files in unison in the direction of their longitudinal extent;
 bringing a first one of said files into engagement with one tooth of said saw and moving it in its cutting direction;
 disengaging said first file from the saw at the end of its stroke and bringing another, the second one of said files into engagement with another tooth of said saw;
 moving said second file in its cutting direction which is opposite to the aforesaid cutting direction of said first file;
 exerting a setting pressure on the respective tooth at the end of the stroke of the respective one of each of said files; and
 continuing the aforesaid steps of alternatingly bringing said files into engagement and out of engagement with said saw, of reciprocatingly moving said files, and of setting the teeth of said saw.

2. Method according to claim 1 comprising the further step of providing two pushing means adapted to set the saw and moving one of said pushing means with each one of said files.

3. Method according to claim 1 in which the disengagement of said first file and the engagement of said second file is obtained by rotating a holder for both files 180° about an axis extending parallel to said files.

4. Method according to claim 1 in which the reciprocating movement of said files is interrupted at each end of the strokes and the disengagement of said first file and the engagement of the second file is carried out during such interruption.

5. In an apparatus for sharpening and setting saws:
 a stationary frame providing a rectilinear guide;
 a slide held in said guide for reciprocating, rectilinear movement therein;
 a casing attached to said slide for participation in the latter's reciprocating movement and adapted to have a portion of it move reciprocatingly transversely to the direction of movement of said slide;
 a tool-holder carried by said portion of said casing and adapted to receive two files in a position paralleling said guide and at a distance from each other;
 said holder being supported by said portion of said casing rotatably about a first axis extending parallel to and being equally spaced from two files carried by it;
 means for imparting reciprocating movement to said slide and its associated casing and tool holder;
 means adapted to reciprocatingly move said portion of said casing and the said associated tool holder transversely to said guide; and
 means engaging said slide and said tool holder and being adapted to impart a 180° rotation to said tool holder about said first axis.

6. In an apparatus according to claim 5 in which said casing is attached to said slide pivotably about a second axis paralleling said guide and said first axis of rotation of said holder, and in which a part of said casing remote from said second axis constitutes said portion of said casing carrying said holder.

7. In an apparatus according to claim 5 in which said means engaging said slide and said tool holder comprise stationary gear means on said slide engaging gear means connected with said holders so as to rotate said holder upon the reciprocating movement of said portion of said casing relative to said slide.

8. In an apparatus according to claim 7 in which a ratchet means is inserted between said gear means and said holder, said ratchet means being adapted to rotate said holder in one direction only.

9. In an apparatus according to claim 7 in which said casing and holder are each provided with indexing means adapted to engage one another and secure the holder in its positions of engagement of the files with a saw.

10. In an aparatus according to claim 5 in which one of said holder and said files are provided with pushers adapted to set a tooth of a saw at the end of a cutting stroke of a file.

11. In an apparatus according to claim 10 in which at least one of said pushers is adjustable in the direction of the longitudinal axis of rotation of said holder so as to impart equal set to successive teeth of a saw.

12. In an apparatus according to claim 10 in which said pushers are formed by projections on files held by said tool holder.

References Cited
UNITED STATES PATENTS

| | | | |
|---|---|---|---|
| 1,157,890 | 10/1915 | Miotke | 76—33 |
| 1,259,692 | 3/1918 | Weiss | 76—33 |

BERNARD STICKNEY, Primary Examiner

U.S. Cl. X.R.

76—112